Jan. 9, 1945.  C. BRODSKY  2,366,766
POULTRY WATERING DRIP FOUNTAIN
Filed Jan. 9, 1943
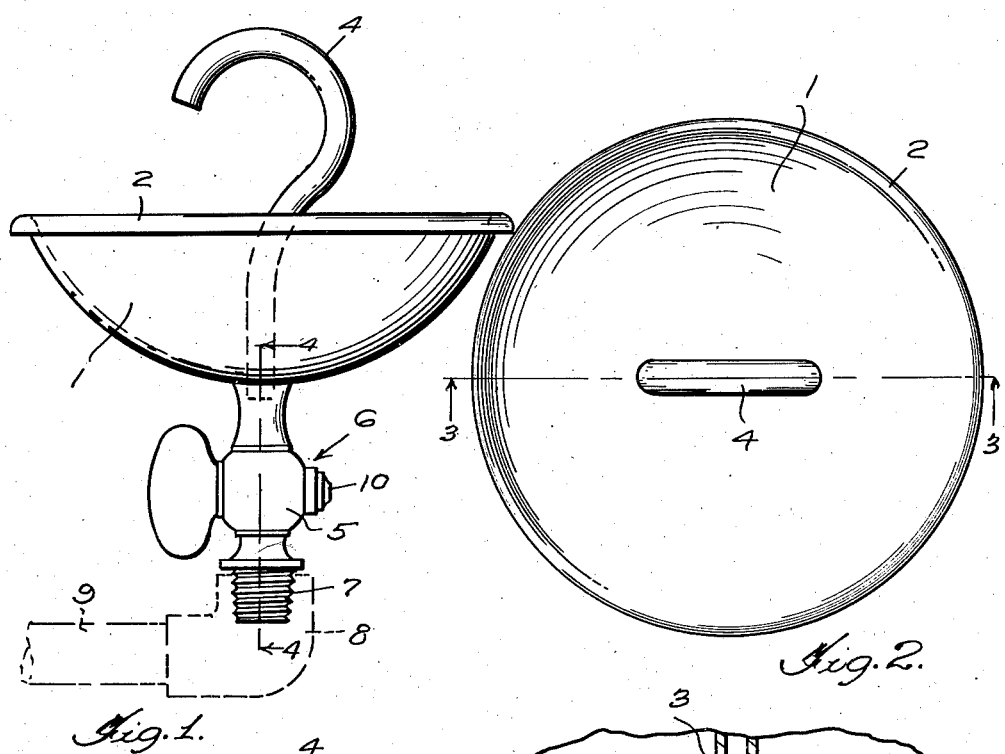
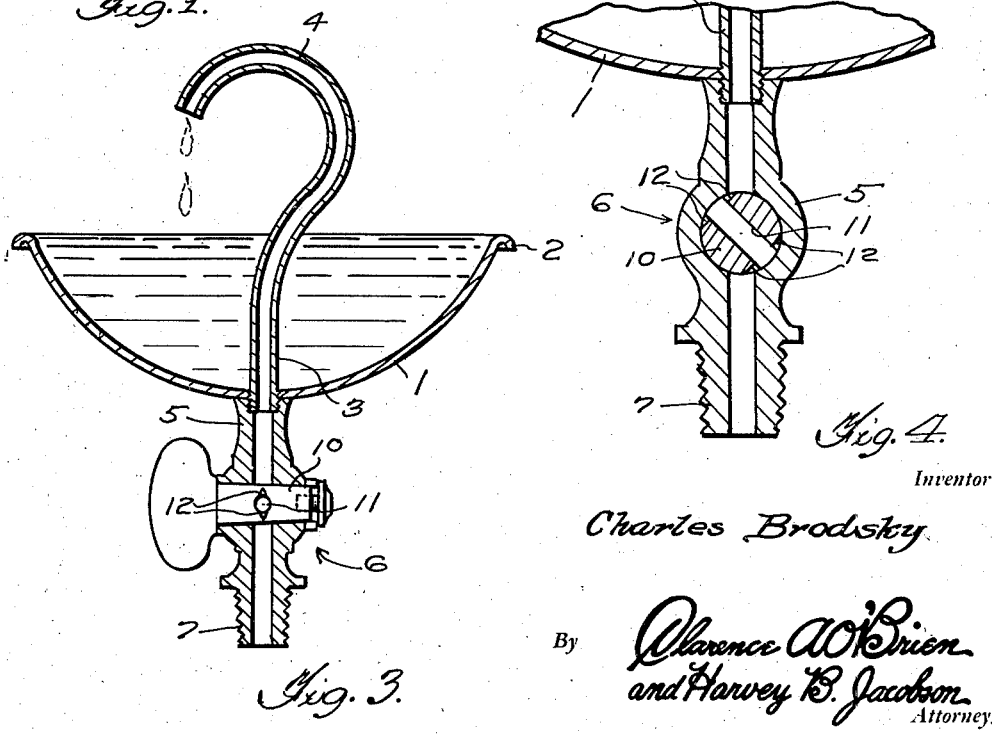
Inventor
Charles Brodsky
By Clarence A. O'Brien
and Harvey B. Jacobson
Attorneys Patented Jan. 9, 1945

2,366,766

UNITED STATES PATENT OFFICE 2,366,766

POULTRY WATERING DRIP FOUNTAIN

Charles Brodsky, Brooklyn, N. Y.

Application January 9, 1943, Serial No. 471,837

1 Claim. (Cl. 119—74)

The present invention relates to new and useful improvements in poultry watering fountains and has for its primary object to provide, in a manner as hereinafter set forth, a device of this character comprising a drip feed and overflow for attracting the attention of the poultry and tempting them to drink the water, thus keeping said poultry active and healthy.

Another very important object of the invention is to provide a poultry watering fountain of the aforementioned character comprising a control valve embodying a novel construction whereby fine adjustments may be expeditiously made for regulating the feed of the water.

Other objects of the invention are to provide a poultry watering fountain of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is an elevational view of a poultry watering fountain constructed in accordance with the present invention.

Figure 2 is a top plan view of the device.

Figure 3 is a vertical sectional view, taken substantially on the line 3—3 of Figure 2.

Figure 4 is a view in vertical section through the control valve, taken substantially on the line 4—4 of Figure 1.

Referring now to the drawing in detail, it will be seen that the embodiment of the invention which has been illustrated comprises a cup 1 for the reception of water, said cup being formed of any suitable material and capacity. The cup 1 includes a rounded peripheral flange 2.

Threaded through a centrally located opening which is provided therefor in the cup 1 is a tube 3. At its upper end, the tube 3 terminates in a gooseneck 4 having its open end located above the cup 1 for discharging drops of water by gravity thereinto.

The lower end portion of the tube 3 which projects downwardly through the cup 1 is threaded into the internally threaded upper end portion of the body 5 of a control valve 6. The valve body 5 further includes an externally threaded lower end portion 7 which is screwed home in an upstanding leg of an elbow 8 on one end of a water supply pipe 9 from any suitable source. The control valve 6 further includes a manually adjustable plug 10 which is journaled in the body 5. Extending diametrically through the plug 10 is a passage 11. Circumferential slits 12 in the plug 10 communicate with the end portions of the passage 11 on diametrically opposite sides thereof.

It is thought that the manner in which the fountain functions will be readily apparent from a consideration of the foregoing. Briefly, water from the supply pipe 9 passes upwardly through the valve 6 and the tube 3 and drips by gravity from the discharge end of the gooseneck 4 into the cup 1. The excess or overflow, when the cup 1 is full, drips by gravity from the peripheral flange 2 of said cup. The constantly dripping, sparkling water attracts the attention of the poultry and tempts them to drink. As illustrated to advantage in Figure 4 of the drawing, when the valve 6 is properly adjusted the water enters the passage 11 through one of the small slits 12 at one end of said passage and leaves said passage at its other end through the slit on the diametrically opposite side. The construction and arrangement is such as to facilitate the adjustment of the valve 6 to regulate the drops per minute of the feed as desired. The body 5 of the valve 6 is engaged beneath the cup 1 for firmly locking said cup in position on the threaded lower end portion of the tube 3.

It is believed that the many advantages of a poultry watering fountain constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

A poultry drinking fountain comprising a substantially segmento-spherical drinking cup having a central threaded opening in the bottom thereof, a gooseneck discharge spout of question mark form having its shank end threaded through said cup opening and its curved end projecting above the top of the cup, and a valve for causing trickle flow of water to said discharge spout and including a valve body having its outlet end threaded on the shank end of the discharge spout and against the bottom of the drinking cup.

CHARLES BRODSKY.